(12) United States Patent
Chae et al.

(10) Patent No.: US 9,184,972 B2
(45) Date of Patent: Nov. 10, 2015

(54) FREQUENCY OFFSET ESTIMATION METHOD IN OFDM SYSTEM AND OFDM RECEIVER USING THE SAME

(71) Applicant: Research & Business Foundation Sungkyunkwan University, Suwon-si (KR)

(72) Inventors: Keunhong Chae, Suwon-si (KR); Seokho Yoon, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 0 days.

(21) Appl. No.: 14/339,664

(22) Filed: Jul. 24, 2014

(65) Prior Publication Data

US 2015/0030108 A1 Jan. 29, 2015

(30) Foreign Application Priority Data

Jul. 24, 2013 (KR) .................... 10-2013-0087118

(51) Int. Cl.
*H04L 27/26* (2006.01)
(52) U.S. Cl.
CPC .................................. *H04L 27/2659* (2013.01)
(58) Field of Classification Search
CPC .............. H04L 27/2659; H04L 25/266; H04L 27/2655; H04L 27/2657; H04L 27/266; H04L 27/2663
USPC .................................. 375/260, 326, 343, 344
See application file for complete search history.

(56) References Cited

U.S. PATENT DOCUMENTS

| 6,628,606 | B1 * | 9/2003 | Hong | .................. H04L 27/2659 375/260 |
| 7,324,601 | B2 * | 1/2008 | Kim | ..................... H04L 27/2675 375/343 |
| 8,325,831 | B2 * | 12/2012 | Lee | ..................... H04L 27/2613 375/260 |

FOREIGN PATENT DOCUMENTS

KR 10-2010-0000606 A 1/2010

OTHER PUBLICATIONS

Schmidl, Timothy M., et al. "Robust frequency and timing synchronization for OFDM", IEEE Transactions on Communications, vol. 45, No. 12, Dec. 1997: 1613-1621.

(Continued)

*Primary Examiner* — Betsy Deppe
(74) *Attorney, Agent, or Firm* — NSIP Law

(57) ABSTRACT

A method of estimating a frequency offset based on a training symbol in a receiver of an orthogonal frequency division multiplexing (OFDM) system, includes receiving a first training symbol having a periodicity and a predetermined second training symbol, and calculating a correlation value for the first training symbol based on a coherence phase bandwidth (CPB). The method further includes determining a position of a peak value from the correlation value for an integer multiple frequency offset candidate based on a threshold value, and calculating a correlation value for the second training symbol based on the CPB. The method further includes estimating a position corresponding to a maximum value of the correlation value for the second training symbol as the frequency offset based on the position of the peak value.

18 Claims, 5 Drawing Sheets

(56) References Cited

OTHER PUBLICATIONS

Bang, Keukjoon, et al. "A Coarse Frequency Offset Estimation in an OFDM System Using the Concept of the Coherence Phase Bandwidth", IEEE International Conference on Communications, vol. 2, 2000: 1135-1139.

Lee, J. et al., "Low Complexity Estimation of Frequency Offset for OFDM Systems," ICDS 2013, The Seventh International Conference on Digital Society, 2013 (pp. 37-41).

Korean Office Action mailed Feb. 10, 2015 in counterpart Korean Application No. 10-2013-0087118 (4 pages, in Korean).

\* cited by examiner

FREQUENCY OFFSET ESTIMATION METHOD IN OFDM SYSTEM AND OFDM RECEIVER USING THE SAME

CROSS-REFERENCE TO RELATED APPLICATION

This application claims the benefit under 35 USC 119(a) of Korean Patent Application No. 10-2013-0087118 filed on Jul. 24, 2013, in the Korean Intellectual Property Office, the entire disclosure of which is incorporated herein by reference for all purposes.

BACKGROUND

1. Field

The following description relates to a method of estimating a frequency offset in an orthogonal frequency division multiplexing (OFDM) system and an OFDM receiver using the same.

2. Description of Related Art

An orthogonal frequency division multiplexing (OFDM) technology is a transmission scheme in which an available frequency band is divided into a plurality of sub-bands, and signals are transmitted by being allocated to orthogonal carrier frequencies of the respective sub bands in an overlapping manner. When compared to a single carrier wave system, the OFDM is widely used as a standardized wireless communication modulation scheme due to its superior performance in a multipath fading channel environment, i.e., a high transmission speed, and superior frequency efficiency.

However, the OFDM system is excessively sensitive to frequency offsets. An integer frequency offset causes interference with respect to shift of indexes of sub-carrier waves of demodulated OFDM symbols modulated through fast Fourier transform (FFT), and a fractional frequency offset destructs the orthogonality of sub-carrier waves, leading to interference between sub-carrier waves (intercarrier interference (ICI)).

In order to prevent significant degradation of performance of the OFDM system due to the frequency offset, various frequency offset estimation schemes have been suggested using multiple symbols. The frequency offset estimation methods for estimating frequency offsets of an OFDM system are largely divided into a training symbol based a frequency offset estimation method and a blind based offset estimation method. The training symbol-based frequency offset estimation method estimates frequency offsets by use of a pilot having a certain structure being transmitted from a transmitter end.

The training symbol-based frequency offset estimation method has slightly poor efficiency in the transmission when compared to the blind-based frequency offset estimation method, but has superior estimation performance. The training symbol-based frequency offset estimation method is shown in a paper published by T. M. Schmidl and D. C. Cox ("Robust frequency and timing synchronization for OFDM", IEEE Trans. Commun., vol. 45, no. 12, pp. 1613-1621, December 1997). In addition, the frequency offset scheme is also described in a paper published by Keukjoon Bang and others ("A coarse frequency offset estimation in an OFDM system using the concept of the coherence phase bandwidth", IEEE Transactions on Communications, vol. 49, no. 8, pp. 1320-1324, August 2001).

The open paper "A coarse frequency offset estimation in an OFDM system using the concept of the coherence phase bandwidth" suggests an integer multiple frequency offset estimation that is robust to time offsets by using a coherence phase bandwidth (CPB) in consideration that time offsets affect an integer multiple frequency offset estimation performance in the OFDM system. The method disclosed in the paper provides an integer multiple frequency offset estimation robust to time offsets, but has a computational complexity rapidly increased when the integer frequency offset increases.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of estimating a frequency offset based on a training symbol in a receiver of an orthogonal frequency division multiplexing (OFDM) system, the method including receiving a first training symbol having a periodicity and a predetermined second training symbol, calculating a correlation value for the first training symbol based on a coherence phase bandwidth (CPB), determining a position of a peak value from the correlation value for an integer multiple frequency offset candidate based on a threshold value, calculating a correlation value for the second training symbol based on the CPB, and estimating a position corresponding to a maximum value of the correlation value for the second training symbol as the frequency offset based on the position of the peak value.

The determining of the position of the peak value may include calculating a correlation value for a received signal of the first training symbol, determining a position of a first peak value from the correlation value for the received signal based on the threshold value, and determining positions of remainder peak values based on an interval value obtained by dividing a size of the integer multiple frequency offset candidate by a number of periods of the first training symbol.

The correlation value C(d) for the received signal may be calculated as $$C(d) = \sum_{m=0}^{K-1} \left| \sum_{k=0}^{B_c-1} Z_{1,k+mB_c}^* R_{1,(k+mB_c+d)_N} \right|,$$

and the position of the first peak value may represent a value d of the integer multiple frequency offset candidate corresponding to when the correlation value for the received signal that is calculated according to an increase of the integer multiple frequency offset candidate d={0, 1, ..., N−1} by 1 exceeds the threshold value η, where $R_{1,k}$ is a $k^{th}$ fourier transform output value of a received OFDM first training symbol, $Z_{1,k}$ is a first training symbol in a $k^{th}$ carrier wave, * is a complex conjugate operation, N is a size of fourier transform, $(\ )_N$ is a N-modulo operation, $B_c$ is the CPB, $$K = N/B_c, \eta = \frac{1}{2}n_0'|Z_{1,k}|^2\left|1 - j\cot\left(\frac{\pi n_0'}{N}\right)\right|,$$

$n_0^r$ is a normalized time offset, and j is an imaginary number.

The positions of the remainder peak values may be periodically arranged based on the interval value, starting from the position of the first peak value.

The frequency offset $\hat{\epsilon}$ may be estimated based on an equation:

$$\hat{\epsilon} = \mathrm{argmax}_{f \in candidate} \left\{ \sum_{m=0}^{K-1} \left| \sum_{k=0}^{B_c-1} Z^*_{2,k+mB_c} R_{2,(k+mB_c+f)_N} \right| \right\},$$

where candidate is a set of frequency offset candidates existing in the position of the peak value, $R_{2,k}$ is a $k^{th}$ fourier transform output value of a received OFDM second training symbol, $Z_{2,k}$ is a second training symbol in a $k^{th}$ carrier wave, * is a complex conjugate operation, N is a size of fourier transform, $(\ )_N$ is a N-modulo operation, $B_c$ is the CPB, and $K = N/B_c$.

The first training symbol and the second training symbol may have a relation of $$Z_{1,k} = Z_{2,(k)_{\frac{N}{P}}},$$

where $Z_{1,k}$ is a first training symbol in a $k^{th}$ carrier wave, $Z_{2,k}$ is a second training symbol in a $k^{th}$ carrier wave, $(\ )_N$ is a N-modulo operation, N is a size of a fourier transform, and P is a period of the first training symbol.

A non-transitory computer-readable storage medium storing a program comprising instructions to cause a computer to perform the method.

In another general aspect, there is provided a method of estimating a frequency offset based on a training symbol in a receiver of an orthogonal frequency division multiplexing (OFDM) system, the method including receiving a first training symbol having a periodicity and a predetermined second training symbol, calculating a first correlation value for the first training symbol and a second correlation value for the second training symbol based on a coherence phase bandwidth (CPB), determining a position of a peak value from the first correlation value for an integer multiple frequency offset candidate based on a threshold value, and estimating a position corresponding to a maximum value of the second correlation value as the frequency offset based on of the position of the peak value.

In still another general aspect, there is provided an orthogonal frequency division multiplexing (OFDM) receiver configured to estimate a frequency offset based on a training symbol, the OFDM receiver including an RF unit configured to receive a first training symbol having a periodicity and a predetermined second training symbol, and a frequency offset processor configured to calculate a correlation value for the first training symbol based on a coherence phase bandwidth (CPB), determine a position of a peak value from the correlation value of an integer multiple frequency offset candidate based on a threshold value, calculate a correlation value for the second training symbol based on the CPB, and estimate a position corresponding to a maximum value of the correlation value calculated for the second training symbol as the frequency offset based on the position of the peak value.

The frequency offset processor is configured to calculate a correlation value for a received signal of the first training symbol, determine a position of a first peak value from the correlation value for the received signal based on the threshold value, and determine positions of remainder peak values based on an interval value obtained by dividing a size of the integer multiple frequency offset candidate by a number of periods of the first training symbol.

Other features and aspects will be apparent from the following detailed description, the drawings, and the claims.

Figure 1:
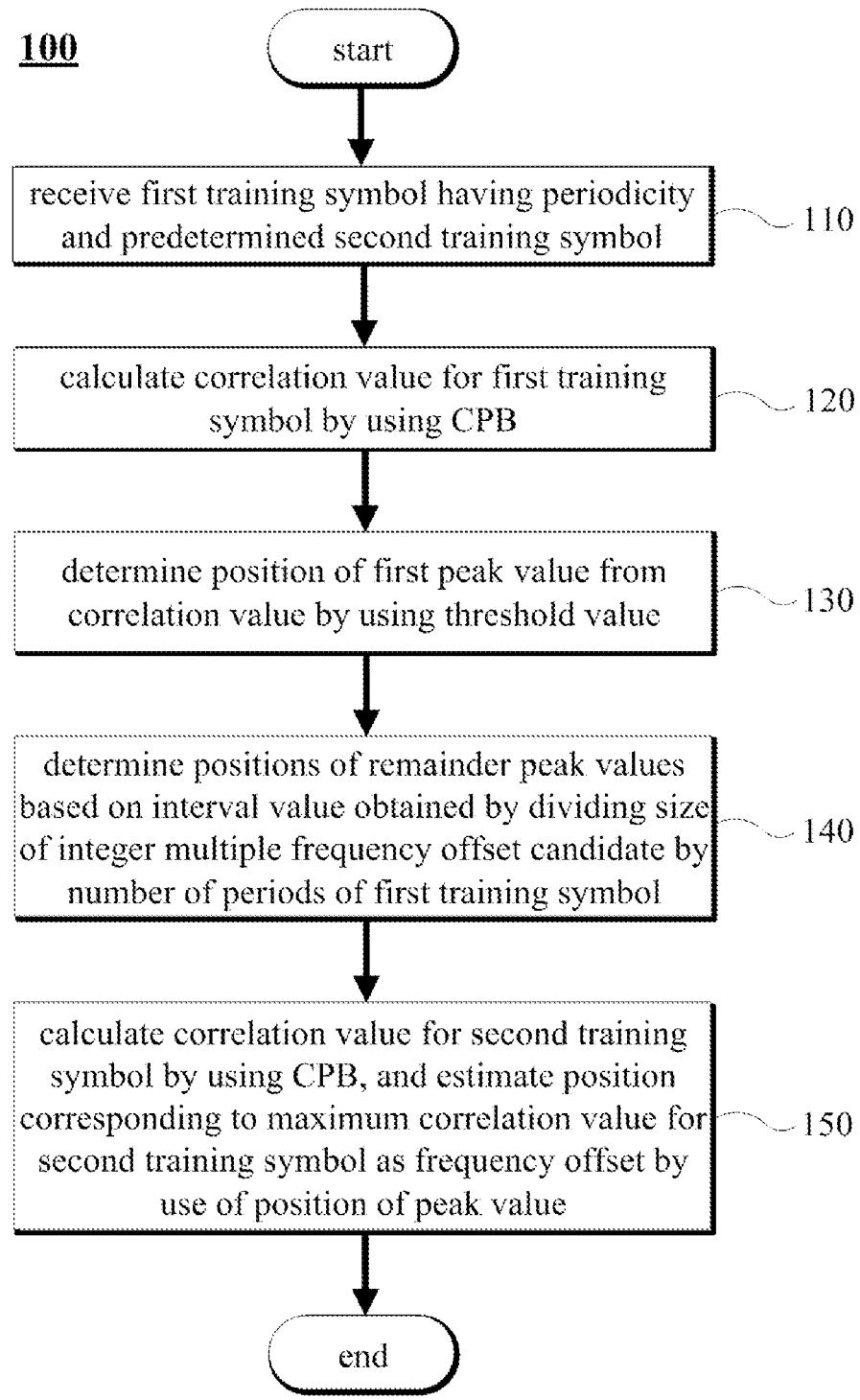
FIG. 1 is a flowchart illustrating an example of a frequency offset estimation method in an OFDM system.

Throughout the drawings and the detailed description, unless otherwise described, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

The following disclosure incorporates the disclosure of Korean Patent Application Publication No. 10-2010-0000606.

Hereinafter, a frequency offset estimation method in an OFDM and an OFDM receiver using the same will be described in detail with reference to the accompanying drawings. The frequency offset estimation according to the following description of technology is a scheme using a training symbol.

FIG. 1 is a flowchart illustrating an example of a frequency offset estimation method 100 in an OFDM system. In operation 110, the frequency offset estimation method includes receiving a first training symbol having a periodicity, and a predetermined second training symbol. In operation 120, the frequency offset estimation method includes calculating a correlation value for the first training symbol by using a coherence phase bandwidth (CPB). In operation 130, the frequency offset estimation method includes determining a position of a first peak value from the correlation value by using a threshold value. In operation 140, the frequency offset estimation method includes determining positions of remainder peak values based on an interval value obtained by dividing a size of an integer multiple frequency offset candidate by a number of periods of the first training symbol. In operation 150, the frequency offset estimation method includes calculating a correlation value for the second training symbol by using the CPB, and estimating a position corresponding to a maximum of the correlation value for the second training symbol as the frequency offset by use of the position of the peak value (150).

Figure 2:
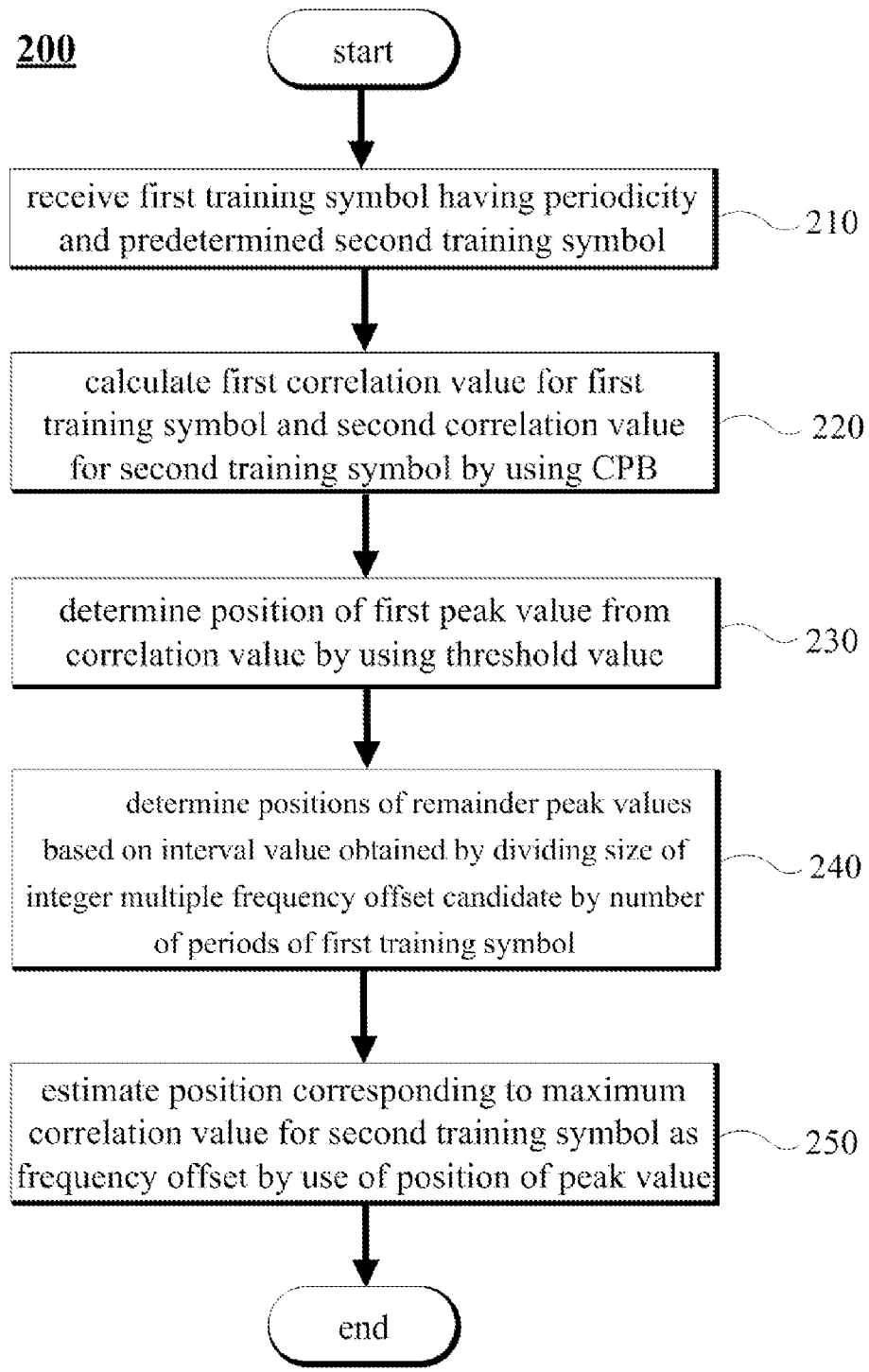
FIG. 2 is a flowchart illustrating another example of a frequency offset estimation method in an OFDM system.

FIG. 2 is a flowchart illustrating another example of a frequency offset estimation method 200 in an OFDM system. In operation 210, the frequency offset estimation method includes receiving a first training symbol having a periodicity, and a predetermined second training symbol. In operation 220, the frequency offset estimation method includes calculating a first correlation value for the first training symbol, and a second correlation value for the second training symbol, by using a CPB. In operation 230, the frequency offset estimation method includes determining a position of a first peak value from the first correlation value by using of a threshold value. In operation 240, the frequency offset estimation method includes determining positions of remainder peak values based on an interval value obtained by dividing a size of an integer multiple frequency offset candidate by a number of periods of the first training symbol. In operation 250, the frequency offset estimation method includes estimating a position corresponding to a maximum value of a correlation value for the second training symbol as the frequency offset by use of the position of the peak.

The frequency offset estimation method shown in FIG. 2 is different from the frequency offset estimation method of FIG. 1 in that calculation of a correlation value for a predetermined second training symbol using CPB is simultaneously or successively performed with calculation of a correlation value for a first training symbol having a first periodicity. The frequency offset estimation method shown in FIG. 2 may be variously implemented depending on a configuration of hardware estimating offsets in the OFDM receiver.

In the example of the frequency offset estimation method, the sequence of calculation of correlation values for training symbols is not important. The example of the frequency offset estimation method is characterized in recognizing a position of a peak value from a correlation value for a first training symbol having a periodicity, and using frequency offset candidates having the position of the peak value to estimate a frequency offset with respect to a predetermined second training symbol. The example of frequency offset estimation method reduces a number of sets of frequency offset candidates and reduces complexity in the overall frequency offset estimation.

The first training symbol having a periodicity means a training symbol repetitively representing a part of a second training symbol, that is, a predetermined training symbol.

The first training symbol and the second training symbol are generated from a transmitter. The transmitter generates the training symbols by use of a quadrature amplitude modulation (QAM) or a phase-shift keying (PSK).

In the receiving of the training symbols (operations 110, 210), modulated training symbols are inverse fourier transformed, and subjected to frequency offsets, timing offsets and additive white gaussian noise, and then fourier transformed to be received. The received signal of the training symbol is expressed by Equation 1 below;

$$R_k = Z_{k-\epsilon} e^{-j2\pi n_0(k-\epsilon)/N} + W_k,$$ [Equation 1]

where $R_k$ is a $k^{th}$ fourier transform output value of a received OFDM training symbol, $Z_k$ is a training symbol in a $k^{th}$ carrier wave, N is a size of fourier transform, $W_k$ is a fourier transform of a complex additive white gaussian noise $w_n$, and $\epsilon$ is an integer frequency offset.

A process of calculating a correlation value for a training symbol using a CPB is expressed by Equation 2 below:

$$C(d) = \sum_{m=0}^{K-1} \left| \sum_{k=0}^{B_c-1} Z_{1,k+mB_c}^* R_{1,(k+mB_c+d)_N} \right|,$$ [Equation 2]

where, $B_c$ is represented as $$B_c = \frac{1}{2t_0'} N$$

using CPB, and $K = N/B_c$.

Hereinafter, it is defined that $Z_{1,k}$ represents a first training symbol in a $k^{th}$ carrier wave, and $Z_{2,k}$ represents a second training symbol in a $k^{th}$ carrier wave. The first training symbol and the second symbol have a relation of $$Z_{1,k} = Z_{2,(k)_{\frac{N}{P}}},$$

where $(\ )_N$ is a N-modulo operation, N is a size of a fourier transform, and P is a period of the first training symbol.

In the determining of a first peak value of a correlation value for integer frequency offset candidates (operation 130 and 230), the position of a first peak value of a correlation value for integer frequency offset candidates is determined as a value d corresponding to when the C(d) exceeds the threshold value (η) according to increase of the d by 1 in Equation 2. In this case, the threshold value is expressed by Equation 3 below:

$$\eta = \frac{1}{2} n_0' |Z_{1,k}|^2 \left| 1 - j\cot\left(\frac{\pi n_0'}{N}\right) \right|,$$ [Equation 3]

where d represents the integer multiple frequency offset candidates in the range of $\{0, 1, \ldots, N-1\}$, C(d) is a correlation value between a received signal and a training symbol, and $n_0'$ is an allowable normalized timing offset.

In the determining of the positions of remainder peak values, the remainder peak values are determined based on an interval value I obtained by dividing a size of the integer frequency offset candidate by the number of periods of the first training symbol. That is, for the positions of the remainder peak values, a second peak value exists while being spaced apart from the position of the first peak value by the interval value I, and a next peak value exists while being spaced apart from the position of the second peak value by the interval value I. In other words, the position of the peak value is provided at a position corresponding to n*I from the position of the first peak value (n is a natural number).

As for the first training symbol having a periodicity, peak values of a correlation value are periodically represented at an interval value corresponding to a value of the size of an integer multiple frequency offset candidate divided by the number of periods of the first training symbol having a periodicity.

In the estimating of the frequency offset for the second training symbol by use of the peak value (operations 150 and 250), the positions of the peak values are determined as integer multiple frequency offset candidate values, and an integer multiple frequency offset is estimated only with respect to the integer frequency offset candidate values as shown in Equation 4 below, in which a position corresponding to a maximum value of a correlation value for the second training symbol is estimated as the integer multiple frequency offset:

$$\hat{\varepsilon} = \mathrm{argmax}_{f \in candidate} \left\{ \sum_{m=0}^{K-1} \left| \sum_{k=0}^{B_c-1} Z^*_{2,k+mB_c} R_{2,(k+mB_c+f)_N} \right| \right\} \quad \text{[Equation 4]}$$

where candidate represents a set of frequency offset candidate solutions.

The prior art for reducing computational complexity using a threshold value requires on average N/2 correlation operations, that is, half of the number of integer frequency offset candidates N.

An average computational complexity according an example of the proposed frequency offset estimation method may be expressed as Equation 5 using the number of periods P of a training symbol having a periodicity.

$$\frac{N}{2P} + P \quad \text{[Equation 5]}$$

In this case, due to the training symbol having a periodicity, peak values are periodically represented within a range of integer multiple frequency offset candidates, so that the computation complexity is 1/P of the computational complexity in the prior art, having the integer frequency offset candidates reduced into P. The summation of the number of correlations for the respective integer multiple frequency offset candidates, which are reduced in number provides a computational complexity of integer multiple frequency offset estimation as in Equation 5.

Figure 3:
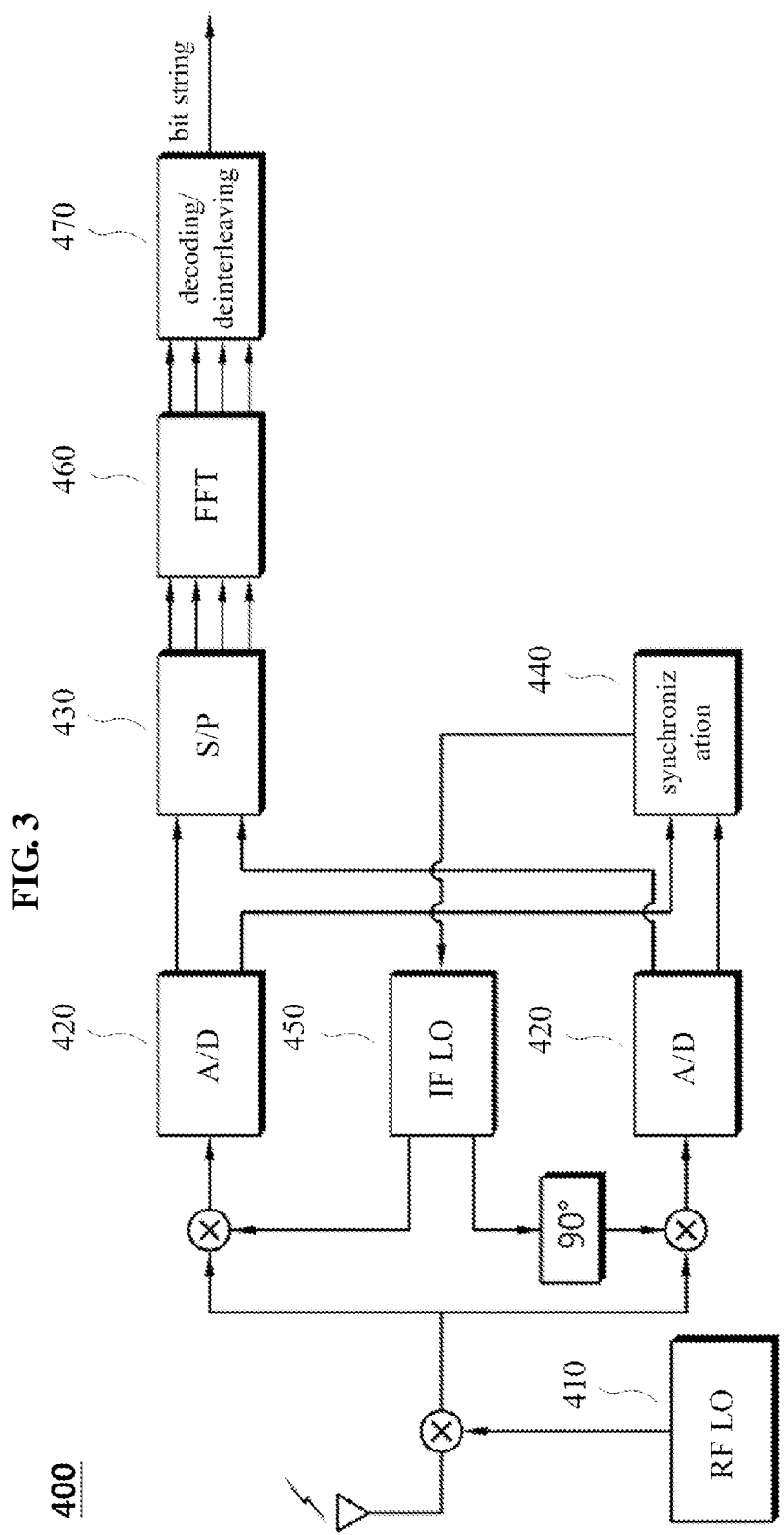
FIG. 3 is a block diagram illustrating an example of a configuration of an OFDM receiver.

FIG. 3 is a block diagram illustrating an example of a configuration of an OFDM receiver 400. Referring to FIG. 3, the OFDM receiver 400 includes a radio frequency local oscillator (RF LO) 410, an analog digital converter (A/D) 420, a serial parallel converter (S/P) 430, a synchronization block 440, an intermediate frequency local oscillator (IF LO) 450, a fast Fourier transform block (FFT) 460 and a decoding/deinterleaving block 470.

A received signal is input into the S/P 430 and the synchronization block 440 after passing through the A/D 420, and an output of the synchronization block 440 is input into the A/D by being fed back to the IF LO 450. The synchronization block 440 performs time synchronization and frequency synchronization. The received signal having passed through the S/P 430 is transmitted to the FFT block 460, and then output as a bit string after passing through the decoding/deinterleaving block 470. The example of the frequency offset estimation method may be performed by the synchronization block 440 in the block diagram of FIG. 3 illustrating the OFDM receiver 400.

Figure 4:
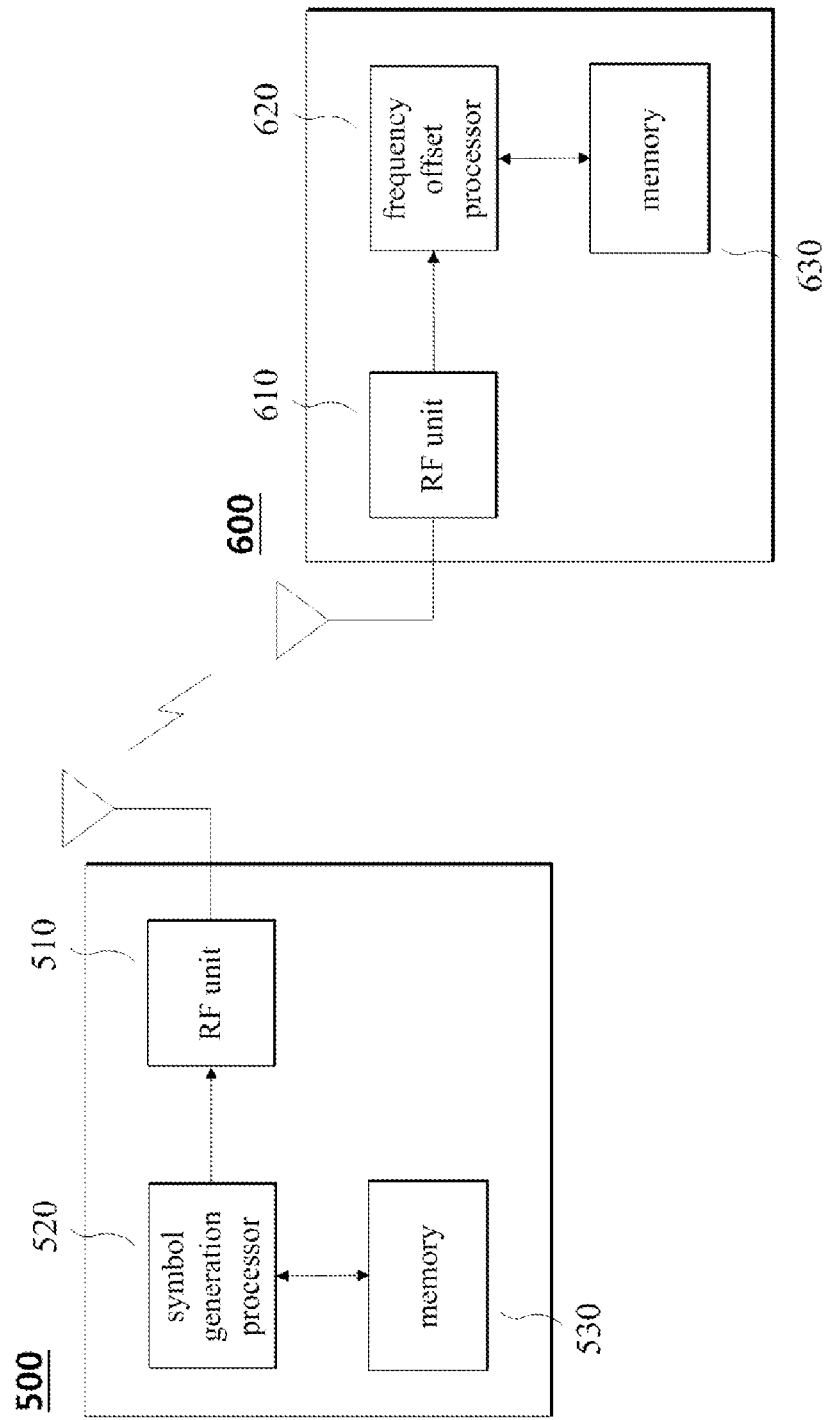
FIG. 4 is a block diagram illustrating an example of a configuration of an OFDM transmitter and an OFDM receiver, using a periodic training symbol and a predetermined training symbol.

FIG. 4 is a block diagram illustrating an example of a configuration of an OFDM transmitter 500 and an OFDM receiver 600, using a periodic training symbol and a predetermined training symbol. The OFDM transmitter 500 includes a symbol generation processor 520, a memory 530 and a radio frequency unit (RF unit) 510. The symbol generation processor 520 generates an OFDM signal including a first training symbol having a periodicity and a predetermined second training symbol, and transmits the generated OFDM signal. The memory 530 is connected to the symbol generation processor 520, and stores various pieces of information that are used to operate the symbol generation processor 520. The RF unit 510 is connected to the symbol generation processor 520, and transmits and/or receives a radio signal.

The OFDM receiver 600 includes an RF unit 610, a frequency offset processor 620, and the memory 630. The RF unit 610 is configured to receive the OFDM signal including the first training symbol having the periodicity and the predetermined second training symbol. The frequency offset processor 620 is configured to determine positions of peak values for integer multiple frequency offset candidates by use of a CPB correlation value calculated for the first training symbol, and a threshold value. The frequency offset processor 620 is further configured to estimate a position of a maximum value of a CPB correlation value calculated for the second training symbol as a frequency offset based on the positions of the peak values. The memory 630 is configured to store various pieces of information that are used to estimate the frequency offset.

In more detail, the frequency offset processor 620 calculates a correlation value for a received signal of a first training symbol, and determines a position of a first peak value from the correlation value by use of a threshold value. The frequency offset processor 620 further determines positions of remainder peak values based on an interval value obtained by dividing the size of an integer multiple frequency offset by a number of periods of the first training symbol. The correlation and the determination of the positions of peak values are performed in the same manner as the above. In addition, the frequency offset processor 620 estimates a final frequency offset by use of integer multiple frequency offset candidates limited by the positions of the peak values as shown in Equation 4.

Figure 5A:
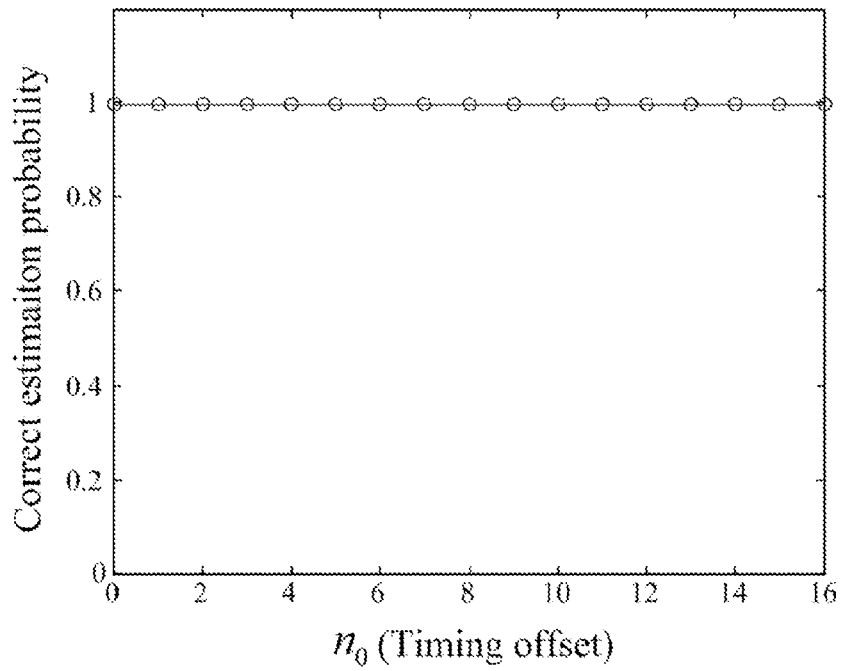
FIG. 5A is a graph illustrating an example of a result of an experiment on a conventional frequency offset estimation scheme.
Figure 5B:
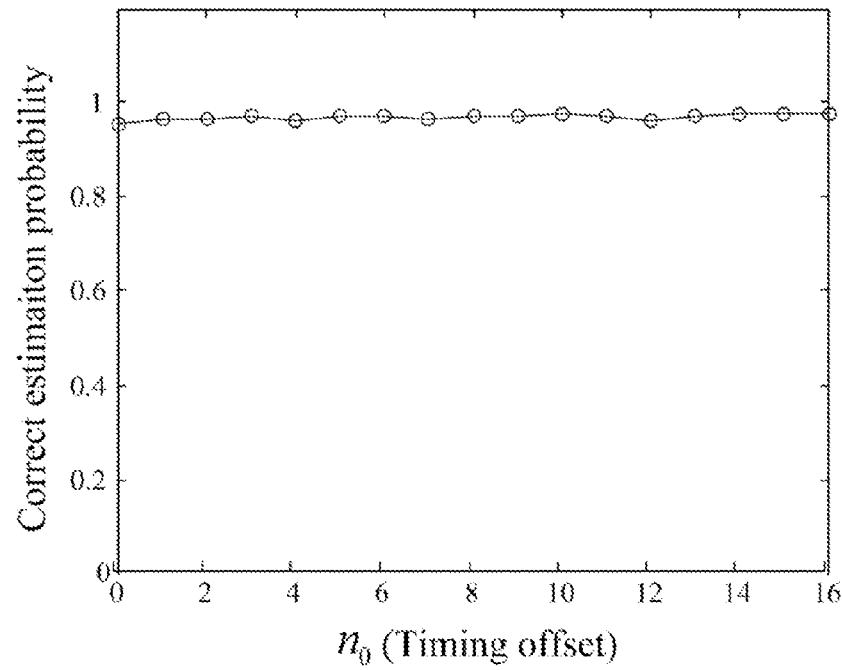
FIG. 5B is a graph illustrating an example of a result of an experiment on a frequency offset estimation scheme using a periodical training symbol and a predetermined training symbol.

FIG. 5A is a graph illustrating an example of a result of an experiment on a conventional frequency offset estimation scheme, and FIG. 5B is a graph illustrating an example of a result of an experiment on a frequency offset estimation scheme using a periodic training symbol and a predetermined training symbol. In order to verify the effect of the example of the frequency offset estimation scheme, the conventional frequency offset estimation scheme (Korean Unexamined Patent Application Publication No. 10-2010-0000606) is compared with the frequency offset estimation scheme using a periodic training symbol and a predetermined training symbol.

As for simulation conditions, it is assumed that a SNR is 5 dB, an allowable normalized timing offset is 16, the size of fourier transform is 1024, the normalized time offsets is an integer of 0 or above and 16 or below, and the number of periods of a periodic training symbol is 4. A training symbol randomly generated is divided into four parts, and a first part of the training symbol is repeated, thereby generating a training symbol having a periodicity.

In the conventional technology, the correlation runs 512 iterations under the simulation conditions. However, according to the proposed frequency offset estimation method, the iteration count of the correlation is calculated as $$\frac{N}{2P} + P = \frac{1024}{2 \times 4} + 4 = 132.$$

FIG. 5A is a graph showing a probability of the conventional technology precisely estimating the integer frequency offset with timing offset, FIG. 5B is a graph showing a probability of precisely estimating the integer frequency offset with timing offset according to an example of the proposed frequency offset estimation method. It can be seen that when compared with FIG. 5A, FIG. 5B exhibits that an estimation probability in which integer multiple frequency offset estimation is correctly estimated within a range of allowable time offsets is similar to that of FIG. 5A. In conclusion, the example of the proposed frequency offset estimation method significantly decreases the complexity while maintaining a similar level of integer multiple frequency offset estimation.

According to the technology described below, a frequency offset is estimated by use of a training symbol having a periodicity and a predetermined training symbol. Since candidates for the frequency offset is reduced through the training symbol having a periodicity, the computational complexity is not high even if a number of integer frequency offsets increases.

The various units, elements, and methods described above may be implemented using one or more hardware components, one or more software components, or a combination of one or more hardware components and one or more software components.

A hardware component may be, for example, a physical device that physically performs one or more operations, but is not limited thereto. Examples of hardware components include microphones, amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of estimating a frequency offset based on a training symbol in a receiver of an orthogonal frequency division multiplexing (OFDM) system, the method comprising:
    receiving a first training symbol having a periodicity and a predetermined second training symbol;
    calculating a correlation value for the first training symbol based on a coherence phase bandwidth (CPB);
    determining a position of a peak value from the correlation value for an integer multiple frequency offset candidate based on a threshold value;
    calculating a correlation value for the second training symbol based on the CPB; and
    estimating a position corresponding to a maximum value of the correlation value for the second training symbol as the frequency offset based on the position of the peak value.

2. The method of claim 1, wherein the determining of the position of the peak value comprises:
    calculating a correlation value for a received signal of the first training symbol; and
    determining a position of a first peak value from the correlation value for the received signal based on the threshold value.

3. The method of claim 2, wherein:
    the correlation value C(d) for the received signal is calculated as $$C(d) = \sum_{m=0}^{K-1} \left| \sum_{k=0}^{B_c-1} Z^*_{1,k+mB_c} R_{1,(k+mB_c+d)_N} \right|;$$

and
the position of the first peak value represents a value of the integer multiple frequency offset candidate, wherein $R_{1,k}$ is a $k^{th}$ fourier transform output value of a received OFDM first training symbol, $Z_{1,k}$ is a first training symbol in a $k^{th}$ carrier wave, * is a complex conjugate operation, N is a size of fourier transform, $(\ )_N$ is a N-modulo operation, $B_c$ is the CPB, $K=N/B_c$, $$\eta = \frac{1}{2} n'_0 |Z_{1,k}|^2 \left| 1 - j\cot\left(\frac{\pi n'_0}{N}\right) \right|,$$

$n_0^t$ is a normalized time offset, and j is an imaginary number.

4. The method of claim 2, wherein the positions of remainder peak values are periodically arranged based on an interval value, starting from the position of the first peak value.

5. The method of claim 1, wherein the frequency offset $\hat{\epsilon}$ is estimated based on an equation:

$$\hat{\epsilon} = \text{argmax}_{f \in \text{candidate}} \left\{ \sum_{m=0}^{K-1} \left| \sum_{k=0}^{B_c-1} Z^*_{2,k+mB_c} R_{2,(k+mB_c+f)_N} \right| \right\},$$

where candidate is a set of frequency offset candidates existing in the position of the peak value, $R_{2,k}$ is a $k^{th}$ fourier transform output value of a received OFDM second training symbol, $Z_{2,k}$ is a second training symbol in a $k^{th}$ carrier wave, * is a complex conjugate operation, N is a size of fourier transform, $(\ )_N$ is a N-modulo operation, $B_c$ is the CPB, and $K=N/B_c$.

6. The method of claim 1, wherein the first training symbol and the second training symbol have a relation of $$Z_{1,k} = Z_{2,(k)_{\frac{N}{P}}},$$

where $Z_{1,k}$ is a first training symbol in a $k^{th}$ carrier wave, $Z_{2,k}$ is a second training symbol in a $k^{th}$ carrier wave, $(\ )_N$ is a N-modulo operation, N is a size of a fourier transform, and P is a period of the first training symbol.

7. A non-transitory computer-readable storage medium storing a program comprising instructions to cause a computer to perform the method of claim 1.

8. A method of estimating a frequency offset based on a training symbol in a receiver of an orthogonal frequency division multiplexing (OFDM) system, the method comprising:
    receiving a first training symbol having a periodicity and a predetermined second training symbol;
    calculating a first correlation value for the first training symbol and a second correlation value for the second training symbol based on a coherence phase bandwidth (CPB);
    determining a position of a peak value from the first correlation value for an integer multiple frequency offset candidate based on a threshold value; and
    estimating a position corresponding to a maximum value of the second correlation value as the frequency offset based on of the position of the peak value.

9. The method of claim 8, wherein:
    the first correlation value C(d) is calculated as $$C(d) = \sum_{m=0}^{K-1} \left| \sum_{k=0}^{B_c-1} Z^*_{1,k+mB_c} R_{1,(k+mB_c+d)_N} \right|;$$

and the position of the peak value represents a value of the integer multiple frequency offset candidate, wherein $R_{1,k}$ is a $k^{th}$ fourier transform output value of a received OFDM first training symbol, $Z_{1,k}$ is a first training symbol in a $k^{th}$ carrier wave, * is a complex conjugate operation, N is a size of fourier transform, $(\,)_N$ is a N-modulo operation, $B_c$ is the CPB, $K=N/B_c$, $$\eta = \frac{1}{2} n'_0 |Z_{1,k}|^2 \left| 1 - j\cot\left(\frac{\pi n'_0}{N}\right) \right|,$$

$n_0^t$ is a normalized time offset, and j is an imaginary number.

10. The method of claim 8, wherein the determining of the position of the peak value comprises determining positions of remainder peak values based on a number of periods of the first training symbol.

11. The method of claim 8, wherein the frequency offset $\hat{\epsilon}$ is estimated based on an equation:

$$\hat{\epsilon} = argmax_{f \in candidate} \left\{ \sum_{m=0}^{K-1} \left| \sum_{k=0}^{B_c-1} Z^*_{2,k+mB_c} R_{2,(k+mB_c+f)_N} \right| \right\},$$

where candidate is a set of frequency offset candidates existing in the position of the peak value, $R_{2,k}$ is a $k^{th}$ fourier transform output value of a received OFDM second training symbol, $Z_{2,k}$ is a second training symbol in a $k^{th}$ carrier wave, * is a complex conjugate operation, N is a size of fourier transform, $(\,)_N$ is a N-modulo operation, $B_c$ is the CPB, and $K=N/B_c$.

12. The method of claim 8, wherein the first training symbol and the second training symbol have a relation of $$Z_{1,k} = Z_{2,(k)_{\frac{N}{P}}},$$

where $Z_{1,k}$ is a first training symbol in a $k^{th}$ carrier wave, $Z_{2,k}$ is a second training symbol in a $k^{th}$ carrier wave, $(\,)_N$ is a N-modulo operation, N is a size of a fourier transform, and P is a period of the first training symbol.

13. A non-transitory computer-readable storage medium storing a program comprising instructions to cause a computer to perform the method of claim 8.

14. An orthogonal frequency division multiplexing (OFDM) receiver configured to estimate a frequency offset based on a training symbol, the OFDM receiver comprising:
an RF unit configured to receive a first training symbol having a periodicity and a predetermined second training symbol; and
a frequency offset processor configured to
calculate a correlation value for the first training symbol based on a coherence phase bandwidth (CPB),
determine a position of a peak value from the correlation value of an integer multiple frequency offset candidate based on a threshold value,
calculate a correlation value for the second training symbol based on the CPB, and
estimate a position corresponding to a maximum value of the correlation value calculated for the second training symbol as the frequency offset based on the position of the peak value.

15. The OFDM receiver of claim 14, wherein the frequency offset processor is configured to:
calculate a correlation value for a received signal of the first training symbol, and
determine a position of a first peak value from the correlation value for the received signal based on the threshold value.

16. The OFDM receiver of claim 15, wherein:
the correlation value C(d) for the received signal is calculated as $$C(d) = \sum_{m=0}^{K-1} \left| \sum_{k=0}^{B_c-1} Z^*_{1,k+mB_c} R_{1,(k+mB_c+d)_N} \right|;$$

and the position of the first peak value represents a value of the integer multiple frequency offset candidate, wherein $R_{1,k}$ is a $k^{th}$ fourier transform output value of a received OFDM first training symbol, $Z_{1,k}$ is a first training symbol in a $k^{th}$ carrier wave, * is a complex conjugate operation, N is a size of fourier transform, $(\,)_N$ is a N-modulo operation, $B_c$ is the CPB, $K=N/B_c$, $$\eta = \frac{1}{2} n'_0 |Z_{1,k}|^2 \left| 1 - j\cot\left(\frac{\pi n'_0}{N}\right) \right|,$$

$n_0^t$ is a normalized time offset, and j is an imaginary number.

17. The OFDM receiver of claim 14, wherein the frequency offset $\hat{\epsilon}$ is estimated based on an equation:

$$\hat{\epsilon} = argmax_{f \in candidate} \left\{ \sum_{m=0}^{K-1} \left| \sum_{k=0}^{B_c-1} Z^*_{2,k+mB_c} R_{2,(k+mB_c+f)_N} \right| \right\},$$

where candidate is a set of frequency offset candidates existing in the position of the peak value, $R_{2,k}$ is a $k^{th}$ fourier transform output value of a received OFDM second training symbol, $Z_{2,k}$ is a second training symbol in a $k^{th}$ carrier wave, * is a complex conjugate operation, N is a size of fourier transform, $(\,)_N$ is a N-modulo operation, $B_c$ is the CPB, and $K=N/B_c$.

18. The OFDM receiver of claim 14, wherein the first training symbol and the second training symbol have a relation of $$Z_{1,k} = Z_{2,(k)_{\frac{N}{P}}},$$

where $Z_{1,k}$ is a first training symbol in a $k^{th}$ carrier wave, $Z_{2,k}$ is a second training symbol in a $k^{th}$ carrier wave, $(\,)_N$ is a N-modulo operation, N is a size of a fourier transform, and P is a period of the first training symbol.

* * * * *